March 3, 1931.  F. A. APGAR  1,795,067
ART OF REFINING HYDROCARBONS
Filed Sept. 14, 1928
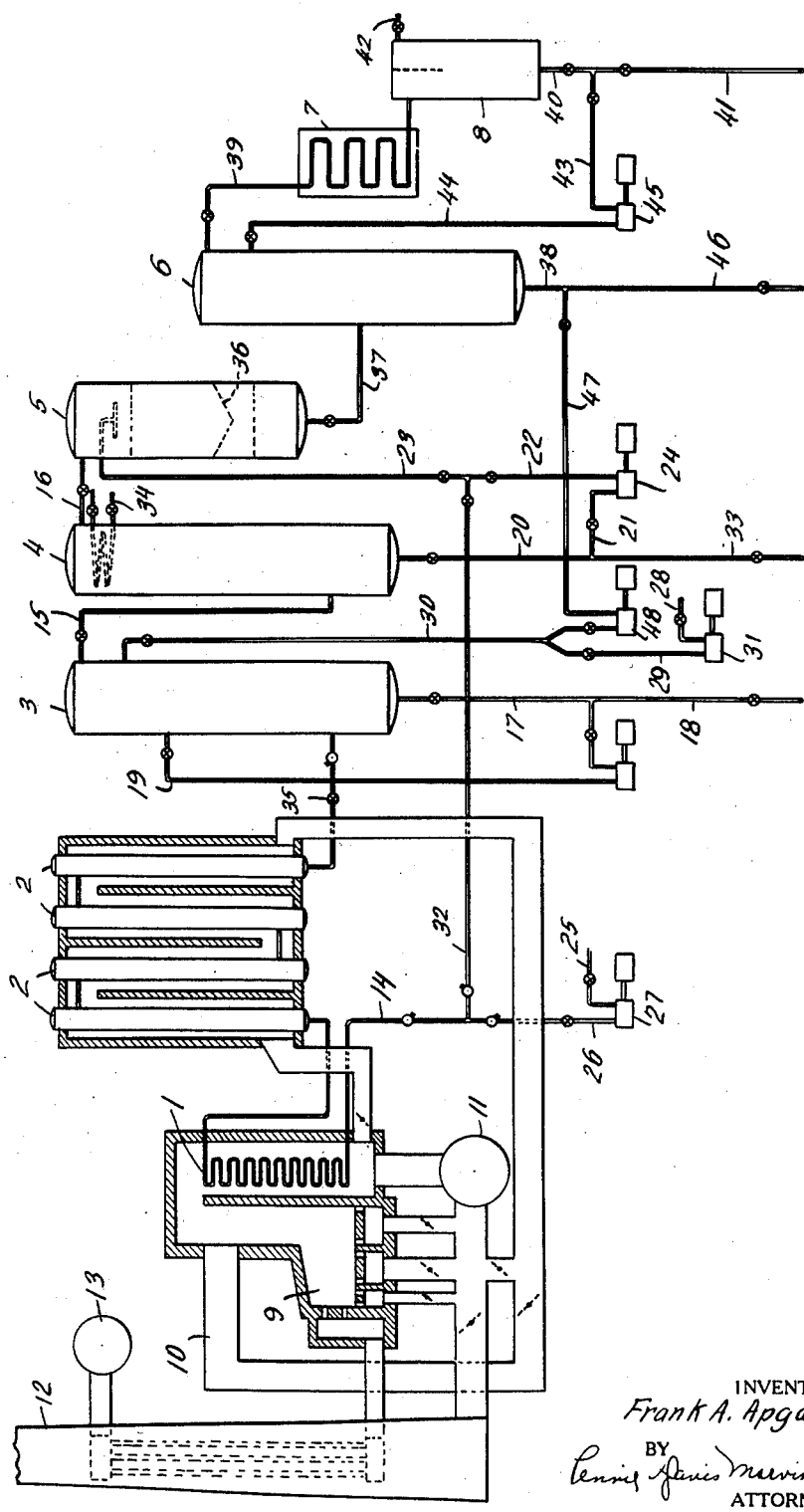
INVENTOR
Frank A. Apgar
BY
ATTORNEYS Patented Mar. 3, 1931

1,795,067

UNITED STATES PATENT OFFICE

FRANK A. APGAR, OF HAMMOND, INDIANA, ASSIGNOR TO SINCLAIR REFINING COMPANY, OF NEW YORK, N. Y., A CORPORATION OF MAINE

ART OF REFINING HYDROCARBONS

Application filed September 14, 1928. Serial No. 305,880.

This invention relates to improvements in the manufacture of gasoline; more particularly the invention relates to improvements in the combined cracking of oil, particularly in vapor phase under severe cracking conditions, to produce motor fuel gasoline and refining of the thus produced gasoline by passage through an adsorptive catalyst in vapor phase.

When raw cracked gasoline or a fraction containing raw cracked gasoline, particularly gasoline produced by severe vapor phase cracking, is passed in vapor phase through an adsorptive catalyst such as fuller's earth, certain unsaturated constituents such as the diolefines, to the extent that they are present, are polymerized to form higher boiling polymers. This reaction affords a means of separating such constituents without involving loss of other unsaturated constituents of special value as components of motor fuel gasoline. The separation of the polymers produced by the vapor catalyst contact is usually accomplished by fractional condensation, liquefaction, either in the refining operation proper or in some subsequent fractionating operation.

As generally practiced, this general method has involved charging of a suitable receptacle with a batch of the adsorptive catalyst, passing the vapors to be refined through this receptacle in contact with the adsorptive catalyst until the catalyst has lost its effectiveness, discharging the spent adsorptive catalyst, replacing the discharged adsorptive catalyst with a fresh charge of the adsorptive catalyst, and so on. The period of operation is thus limited to that period over which the adsorptive catalyst remains sufficiently active to effect the required refining treatment. The adsorptive catalysts commonly used, fuller's earth for example, moreover assume an apparent state of inactivity before the catalyst itself actually becomes ineffective by choking with high boiling polymers produced by the vapor-catalyst contact. This difficulty is particularly acute where the vapors to be refined contain a large proportion of material polymerizing on contact with the adsorptive catalyst, as in the refining of raw cracked gasoline vapors from vapor phase cracking operations in which severe cracking conditions are maintained. The period of operation is thus further limited.

This invention provides an improved combined cracking and refining operation by which the period of effective activity of the adsorptive catalyst is prolonged, by which the useful period of operation is prolonged and by which several further advantages are obtained.

In carrying out the present invention, an oil condensate higher boiling than gasoline is separated from the raw vapor mixture discharged from the cracking operation proper before the vapor mixture including the gasoline vapors to be refined is passed through the adsorptive catalyst, and a part of this oil condensate is passed through the adsorptive catalyst during the refining operation with the vapor mixture including the gasoline vapors to be refined as a washing agent. This oil condensate is separated from the raw vapor mixture from the cracking operation proper after separation of any entrained unvaporized oil or tar or tarry matter; that is this oil condensate used as a washing agent in accordance with the invention is a condensate produced from a vapor mixture substantially free from entrained unvaporized oil or tar or tarry mater. This washing agent passes through the absorptive catalyst as a liquid and it may be separated from the vapors condensed to form the refined gasoline product with liquid material separated therefrom in the refining operation proper or it may be separated in a fractionating operation subsequent to the refining operation proper. Where the raw vapor mixture from the cracking operation proper is subjected to a scrubbing operation for the separation of entrained tar or tarry matter, prior to separation of the oil condensate used as a washing agent, the washing agent together with associated polymers after separation from the vapors condensed to form the refined gasoline product is with advantage reintroduced directly into this scrubbing operation.

This oil condensate washing agent, in carrying out the invention, may be passed through the adsorptive catalyst continuously during the refining operation or at regular intervals during operation, or it may be passed through the adsorptive catalyst at a low rate continuously during the operation and this rate increased periodically during the operation to "flush" choking polymers from the adsorptive catalyst during periods when the rate is increased.

The polymers produced by the vapor-catalyst contact may be separated in the refining operation proper but, in carrying out the invention, it is usually more advantageous to pass the raw gasoline containing vapors through the adsorptive catalyst without separation or discharge of polymers produced by the vapor-catalyst contact in this part of the operation and to discharge the total resulting vapor mixture including such polymers from the refining operation proper through a fractionating operation in which such polymers together with the oil condensate supplied to the refining operation as a washing agent are condensed or separated. By maintaining continued flow of the total vapor mixture through the refining operation proper, retention of polymers or of the oil condensate washing agent in or on the adsorptive catalyst, with consequent decrease in catalyst activity, is reduced to a minimum. Difficulties due to entrainment of the polymers produced by the vapor-catalyst contact or of the oil condensate washing agent in the vapor mixture condensed to form the refined gasoline product are also thus avoided.

The invention will be further described in connection with the accompanying drawing which illustrates, diagrammatically and conventionally, one form of apparatus adapted for carrying out the invention, but it will be understood that the invention can be carried out in other and different forms of apparatus.

The apparatus illustrated includes a vapor phase cracking apparatus described more in detail in an application filed June 13, 1927, by Harry L. Pelzer, Serial No. 198,621. This particular apparatus is shown for purposes of illustration because the invention is useful in connection with the operation of this apparatus and because the invention is particularly useful in connection with the operation of this or other vapor phase cracking apparatus in which severe cracking conditions are maintained in operation.

The vapor phase cracking apparatus illustrated comprises a heating conduit 1 arranged in a heating furnace, a series of digesting drums 2, a scrubbing tower 3 for the separation of tar or tarry matter and a fractionating tower or reflux tower 4. The heating furnace illustrated, in which the heating conduit 1 is arranged, comprises a firebox 9 communicating with the upper end of the heating flue in which the heating conduit 1 is arranged and also with a flue 10 for circulating heating gases through chambers in which the digesting drums 2 are arranged, a fan 11 for withdrawing heating gases from this heating flue and these chambers and for recirculating part of the heating gases therethrough by means of the several branch connections shown and for discharging the balance through a stack 12. A fan 13 is provided for supplying the air required for combustion through a preheating heat exchanger in the stack 12. This part of the apparatus, and its operation, are described in more detail in the application filed by Harry L. Pelzer, noted above.

In operation, raw oil or reflux condensate or a mixture of the two is supplied to the heating conduit 1 through connection 14, is vaporized and the vapors superheated in the heating conduit, the vapors from the heating conduit are discharged through the digesting drums 2 to the scrubbing tower 3 in which tar and tarry matter is separated, and the vapors from the scrubbing tower are discharged through connection 15 to the lower end of the tower 4 in which constituents higher boiling than suitable as components of the gasoline product or part of such high boiling constituents are condensed, the remaining vapors escaping from the upper end of tower 4 through connection 16. The tar separated in tower 3 is discharged through connections 17 and 18. Part of this tar may be reintroduced into the scrubbing tower 3 through connection 19. The oil condensate separated in tower 4 is discharged through connection 20.

In carrying out this invention in the apparatus illustrated, part of the oil condensate discharged from tower 4 through connection 20 is introduced into the upper end of tower 5 to pass through the adsorptive catalyst therein as a washing agent through connections 21, 22 and 23 by means of pump 24.

Raw oil to be supplied to the cracking operation free from tar or tarry matter may be supplied in whole or in part directly to the heating conduit 1 through connections 25, 26 and 14 by means of pump 27. Raw oil to be supplied to the cracking operation containing tar or tarry matter is with advantage introduced into the upper end of scrubbing tower 3 through connections 28, 29 and 30 by means of pump 31. Raw oil free from tar or tarry matter may also be supplied to the upper end of scrubbing tower 3 through connections 28, 29 and 30 by means of pump 31. The oil components or the lower boiling oil components of raw oil introduced into tower 3 through connection 30 are vaporized therein to be condensed in tower 4 leaving tar components or high boiling oil components to be discharged with the tar from tower 3. Particularly where raw oil is introduced into tower 3, the major part of the oil condensate separated in tower 4 is supplied to the heating conduit 1 through connections 20, 21, 22, 32 and 14 by means of pump 24. Any part of this oil condensate not so supplied to the heating conduit 1 in excess of that supplied to the refining operation in accordance with the invention, is discharged through connection 33. The operation of the scrubbing tower 3 may be controlled by regulating the rate of introduction of oil through connection 30 or by regulating this rate conjointly with the rate of reintroduction of tar through connection 19. The operation of the fractionating tower or reflux tower 4 is controlled by regulating the rate of circulation of a cooling medium, for example water or a part of the raw oil to be supplied to the cracking operation, through the cooling coil 34 in the upper end of the tower.

In the production of gasoline in the apparatus illustrated, the heating conduit discharge temperature may be maintained in the neighborhood of 1000–1100° F., the vapor discharge temperature from the digesting drums in the neighborhood of 950–1100° F., the vapor discharge temperautre from the upper end of tower 3 in the neighborhood of 500–550° F., and the vapor discharge temperature from the upper end of tower 4 in the neighborhood of 400–450° F., for example. The oil or oil mixture may be supplied to the heating conduit under a pressure just sufficient to force the oil and oil products through the heating conduit and the rest of the apparatus, 60–80 pounds per square inch, for example. A superatmospheric pressure as high as 40–60 pounds per square inch or more may, however, be maintained through the digesting drums 2 in the apparatus illustrated by means of valve 35.

The vapors escaping from the upper end of tower 4 through connection 16 pass downwardly through the refining tower 5 and through a charge of an adsorptive catalyst supported upon a foraminous partition 36 therein. The adsorptive catalyst, for example, may consist of fuller's earth of 40–60 and 60–80 mesh. The total resulting vapor mixture including polymers produced by the vapor-catalyst contact and the oil condensate washing agent supplied through connection 23 is discharged into the fractionating tower 6 through connection 37. In the fractionating tower 6, the polymers produced by the vapor-catalyst contact and the oil condensate washing agent and any other constituents higher boiling than suitable as components of the gasoline products are separated or condensed from the gasoline vapors and discharged through connection 38. The gasoline vapors escape through connection 39 to condenser 7 arranged to discharge into receiver 8. In the receiver 8 the condensed refined gasoline product is separated from uncondensed vapors and gases, the former is discharged through connection 42. Part of the gasoline condensate may be introduced into the upper end of tower 6 through connections 40, 43 and 44 by means of pump 45 for effecting or controlling the fractionating operation carried out therein. The composite discharged from the refining tower 5 is discharged into the fractionating tower 6 at an intermediate point to afford an opportunity, below the point of introduction, for stripping from the liquid material separated in the fractionating tower all gasoline constituents suitable as components of the gasoline product. Steam may be introduced into the lower end of the fractionating tower to assist this stripping operation.

The liquid material separated in tower 6, or part of it, may be discharged through connections 38 and 46. This liquid material, however, is with advantage in accordance with the invention introduced into the upper end of tower 3 through connections 38, 47 and 30 by means of pump 48 for separation therein of tar or tarry matter and revaporization of oil components including the oil components of the washing agent supplied to the refining operation.

For the production of gasoline, the vapor discharge temperature from the upper end of tower 6 may be maintained in the neighborhood of 350–400° F.

In carrying out the present invention in the apparatus illustrated, a part of the oil condensate separated in tower 4 is introduced into the upper end of the refining tower 5 through connection 23 to pass through the adsorptive catalyst in the refining tower 5 with the vapors or vapor mixture from tower 4 as a washing agent to maintain the activity of the adsorptive catalyst or to prolong the period of activity of the adsorptive catalyst. This oil condensate washing agent may be introduced through connection 23 continuously during the operation or intermittently at regular intervals during the operation or it may be supplied at a low rate continuously and this rate increased periodically during the operation.

The passage of this washing agent through the adsorptive catalyst minimizes any retention in or on the catalyst or polymers or similar material tending to choke the catalyst and prevent it from exerting is full activity for the full period over which it is usefully active to effect the refining operation. This oil condensate is particularly advantageous as a washing agent. It is readily separated from the refined vapors following the refining operation and, in accordance with the invention, may be utilized to assist in promoting separation of polymerized material from the vapors condensed to form the refined gasoline product. This oil condensate, furthermore, is readily separated from associated polymers, in accordance with the invention, to be reused in the complete operation.

In one aspect, the invention provides an improved operation in which a particularly effective washing agent, this heavy oil condensate, is circulated in a cycle at one point in which the oil condensate is applied as a washing agent and at another point in which it is applied, usefully in the complete operation, as a refluxing agent at the same time that it is separated from polymerized material for reuse.

I claim:

1. In the combined cracking of oil to produce gasoline and refining of the cracked gasoline by passage through an adsorptive catalyst in vapor phase, the improvement which comprises subjecting the raw vapor mixture from the cracking operation proper to a scrubbing operation for separation of unvaporized oil, tar and tarry matter, separating an oil condensate higher boiling than gasoline from the raw vapor mixture discharged from the scrubbing operation before the vapor mixture including the gasoline vapors to be refined is passed through the adsorptive catalyst, passing oil condensate so separated from the raw vapor mixture through the adsorptive catalyst with the vapor mixture including the gasoline vapors to be refined during the refining operation as a liquid washing agent, separating the washing agent and associated polymers from the refined vapor mixture and introducing the separated washing agent and polymers directly into the scrubbing operation.

2. In the combined cracking of oil to produce gasoline and refining of the cracked gasoline by passage through an adsorptive catalyst in vapor phase, the improvement which comprises passing the raw vapor mixture from the cracking operation proper successively through a scrubbing operation, a fractionating operation and a refining operation in which the vapors including the gasoline vapors to be refined are passed through an adsorptive catalyst and maintaining in cyclic circulation through the scrubbing operation, the fractionating operation and the refining operation an oil washing agent higher boiling than gasoline, separating the washing agent together with associated polymers from the gasoline vapors refined in the refining operation, introducing the separated washing agent with associated polymers directly into the scrubbing operation, vaporizing the washing agent in the scrubbing operation and condensing it in the fractionating operation, supplying the condensed washing agent from the fractionating operation to the refining operation, and discharging polymers from the scrubbing operation.

3. In the combined cracking of oil to produce gasoline and refining of the cracked gasoline by passage through an adsorptive catalyst in vapor phase, the improvement which comprises subjecting the raw vapor mixture from the cracking operation proper to a scrubbing operation for separation of unvaporized oil, tar and tarry matter, separating an oil condensate higher boiling than gasoline from the raw vapor mixture discharged from the scrubbing operation before the vapor mixture including the gasoline vapors to be refined is passed through the adsorptive catalyst, passing oil condensate so separated from the raw vapor mixture through the adsorptive catalyst with the vapor mixture including gasoline vapors to be refined during the refining operation as a liquid washing agent, and separating the washing agent and associated polymers from the refined vapor mixture.

In testimony whereof I affix my signature.

FRANK A. APGAR.